United States Patent
Hattori et al.

(10) Patent No.: US 9,641,032 B2
(45) Date of Patent: May 2, 2017

(54) MOTOR HAVING MAGNETS EMBEDDED IN A ROTOR AND ELECTRIC COMPRESSOR USING SAME

(71) Applicant: MITSUBISHI HEAVY INDUSTRIES AUTOMOTIVE THERMAL SYSTEMS CO., LTD., Kiyosu-shi, Aichi (JP)

(72) Inventors: Makoto Hattori, Tokyo (JP); Mikito Sasaki, Tokyo (JP); Shinichi Isobe, Tokyo (JP)

(73) Assignee: MITSUBISHI HEAVY INDUSTRIES AUTOMOTIVE THERMAL SYSTEMS CO., LTD., Kiyosu-shi (JP)

( * ) Notice: Subject to any disclaimer, the term of this patent is extended or adjusted under 35 U.S.C. 154(b) by 0 days.

(21) Appl. No.: 14/372,133

(22) PCT Filed: Mar. 21, 2013

(86) PCT No.: PCT/JP2013/058148
§ 371 (c)(1),
(2) Date: Jul. 14, 2014

(87) PCT Pub. No.: WO2013/141323
PCT Pub. Date: Sep. 26, 2013

(65) Prior Publication Data
US 2015/0001981 A1 Jan. 1, 2015

(30) Foreign Application Priority Data
Mar. 23, 2012 (JP) .................................. 2012-067167

(51) Int. Cl.
*H02K 21/12* (2006.01)
*H02K 1/27* (2006.01)

(52) U.S. Cl.
CPC ........... *H02K 1/276* (2013.01); *H02K 1/2766* (2013.01)

(58) Field of Classification Search
CPC ................................ H02K 1/27; H02K 21/14
(Continued)

(56) References Cited

U.S. PATENT DOCUMENTS

| 4,570,333 A | 2/1986 | Jones |
| 2008/0169717 A1 | 7/2008 | Takashima et al. |

(Continued)

FOREIGN PATENT DOCUMENTS

| CN | 102130523 A | 7/2011 |
| CN | 102142758 A | 8/2011 |

(Continued)

OTHER PUBLICATIONS

International Search Report dated Jun. 4, 2013, issued in corresponding application No. PCT/JP2013/0581448.
(Continued)

*Primary Examiner* — Jose Gonzalez Quinones
(74) *Attorney, Agent, or Firm* — Westerman, Hattori, Daniels & Adrian, LLP

(57) ABSTRACT

In the regions around a magnetic shielding space, curved portions and having a rounded shape, which protrude toward the interior space of a magnetic shielding space, are formed at ends of a first side and a second side close to a first end and a second end of an outer-periphery side. In the vicinity of angular portions and of the magnetic shielding space that are positioned at both ends of the outer-periphery side, the magnetic flux density for a given cross-sectional area of a channel through which a short-circuit magnetic flux flows is reduced, and thus, the level of the short-circuit magnetic flux is reduced.

6 Claims, 4 Drawing Sheets

(58) Field of Classification Search
USPC ............ 310/156.53, 156.54, 156.56, 156.57
See application file for complete search history.

(56) References Cited

U.S. PATENT DOCUMENTS

| | | | |
|---|---|---|---|
| 2008/0224558 | A1 | 9/2008 | Ionel |
| 2008/0231135 | A1* | 9/2008 | Suzuki et al. ............ 310/156.53 |
| 2009/0026867 | A1* | 1/2009 | Haruno et al. ........... 310/156.21 |
| 2009/0079287 | A1* | 3/2009 | Hattori et al. ........... 310/156.53 |

FOREIGN PATENT DOCUMENTS

| | | | | |
|---|---|---|---|---|
| JP | 2000-69717 | A | | 3/2000 |
| JP | 2000069717 | A | * | 3/2000 |
| JP | 2004201406 | A | * | 7/2004 |
| JP | 2005-328679 | A | | 11/2005 |
| JP | 3913205 | B2 | | 5/2007 |
| JP | 2008-104323 | A | | 5/2008 |
| JP | 2008-199790 | A | | 8/2008 |
| JP | 2009-219183 | A | | 9/2009 |
| JP | 2009-278860 | A | | 11/2009 |
| JP | 2010-098830 | A | | 4/2010 |
| JP | 2010-154755 | A | | 7/2010 |
| JP | 2010-206882 | A | | 9/2010 |
| JP | 2011-004480 | A | | 1/2011 |
| JP | 4668721 | B2 | | 4/2011 |
| WO | 2006/095721 | A1 | | 9/2006 |

OTHER PUBLICATIONS

Written Opinion dated Jun. 4, 2013, issued in corrsponding application No. PCT/JP2013/0581448.
Office Actium dated Sep. 29, 2015, issued in counterpart Japanese Patent Application No. 2014-506284, Nith English translation (11 pages).
Office Action dated Dec. 28, 2015, issued in counterpart Chinese Application No. 201380006154.5, with English translation (32 pages).
Decision to Grant dated Feb. 2, 2016, issued in counterpart Japanese Application No. 2014-506284 (3 pages). Explanation of relevance- "The Decision to Grant a Patent has been received."
Notification of the Decision to Grant a Patent Right for Patent for Invention dated Aug. 24, 2016, issued in Chinese Application No. 201380006154.5, with English translation "The Notification of the Decision to Grant a Patent Right for Patent for Invention had been received." (2 pages).

* cited by examiner

MOTOR HAVING MAGNETS EMBEDDED IN A ROTOR AND ELECTRIC COMPRESSOR USING SAME

TECHNICAL FIELD

The present invention relates to an embedded magnet motor, in which permanent magnets are embedded in a rotor, and to an electric compressor employing the same.

BACKGROUND ART

In air conditioners and refrigerators, electric compressors with built-in electric motors are used in order to compress refrigerant. These motors for electric compressors employ an embedded magnet electric motor that is provided with a rotor in which a plurality of permanent magnets are embedded at predetermined intervals in the circumferential direction at the outer periphery of a rotor iron core that is formed by laminating magnetic steel plates.

Such an electric motor is provided with a stator and a rotor disposed at the inner side of the stator with a predetermined gap between them, and the rotor has a configuration in which, in a cross-section perpendicular to the axial direction, a plurality of poles, namely, main magnetic pole portions that are provided with magnet-insertion holes for embedding permanent magnets and auxiliary magnetic pole portions (auxiliary salient pole portions) that are constituted of iron core portions between the main magnetic pole portions, are alternately disposed in the circumferential direction. With this configuration, the motor is configured so that rotational torque is gained by utilizing both magnet torque due to magnetic fluxes of the permanent magnets and reluctance torque due to magnetic saliency of the main magnetic pole portions and auxiliary magnetic pole portions.

As shown in FIG. 5, at a main magnetic pole portion 102 of a rotor 101, a non-magnetic portion 104 constituted of a magnetic gap is formed at an end of a permanent magnet 103. In other words, the permanent magnet 103 is inserted into a portion of a magnet-insertion hole 106 formed in the rotor 101, and an opening 105, which is the remaining portion, serves as the non-magnetic portion 104.

This non-magnetic portion 104 is positioned between the main magnetic pole portion 102 and an auxiliary magnetic pole portion 107 that are adjacent to each other in the circumferential direction of the rotor 101, and makes the change of the magnetic-flux density distribution at this position due to the permanent magnet 103 moderate.

CITATION LIST

Patent Literature

{PTL 1} Publication of Japanese Patent No. 4668721

SUMMARY OF INVENTION

Technical Problem

For the purpose of ensuring sufficient strength of the rotor and so forth, in the structure of the non-magnetic portion 104, an outer-peripheral frame 108 that is continuous in the circumferential direction is formed at the outer-most peripheral portion of the rotor 101. In this case, a short-circuit magnetic flux M is generated from a first magnetic pole 103a of the permanent magnet 103 to a second magnetic pole 103b thereof via this outer-peripheral frame 108. As a result, an ineffective magnetic flux that does not contribute to driving the motor is generated in the rotor 101, thus causing the motor efficiency to deteriorate.

An object of the present invention is to provide a motor with which motor performance can be enhanced by enhancing magnetic efficiency and to provide an electric compressor employing the same.

Solution to Problem

In order to make an improvement in the above-described circumstances, a motor of the present invention employs the following solutions.

The present invention is provided with a rotor including the following elements: a cylindrical rotor iron core in which a plurality of main magnetic pole portions and auxiliary magnetic pole portions are alternately disposed in a circumferential direction; substantially V-shaped magnet-insertion holes that are provided in correspondence with the main magnetic pole portions, the magnet-insertion holes respectively being centered on axes d that pass through a center of the rotor and centers of main magnetic pole portions in the circumferential direction, and a protruding portion of each of the magnet-insertion holes being protruding toward the center of the rotor; two magnets embedded in each of the magnet-insertion holes so as to be along with a substantially V-shape, the two magnets of the respective magnet-insertion holes corresponding to respective poles; and magnetic shielding spaces formed in the substantially V-shaped magnet-insertion holes at both ends thereof in the circumferential direction, wherein an angular portion located at at least one of the ends of a side of each of the magnetic shielding spaces has a curved portion which is formed with a predetermined radius of curvature and whose center is located at the outer periphery area of the magnetic shielding space, and the side extends along an outer peripheral portion of the rotor.

By making the angular portions at the ends of the sides extending along the outer peripheral portion of the rotor protrude toward the outer periphery by forming the curved portions as described above, it is possible to reduce the cross-sectional area of portions through which short-circuit magnetic fluxes from the permanent magnets pass, and thus, it is possible to suppress the level of ineffective magnetic fluxes that do not contribute to driving the motor.

As shown in FIG. 3, in a magnetic shielding space 44, curved portions 55 and 56 can be formed at a first side 52 and a second side 53 that intersect an outer-periphery side 51, which extends along the outer peripheral portion of the rotor 12, and the first and second sides are positioned closer to the inner periphery of the rotor 12.

A plurality of magnetic steel plates are laminated in the rotor, and, assuming that T is the thickness of a magnetic steel plate and R is the radius of curvature of the curved portion, a relation "$0.5 \leq R/T \leq 1.0$" is satisfied. In addition, assuming that RG is the external diameter of the rotor, a relation "$0.0001 \leq R/RG \leq 0.01$" is satisfied.

The present invention may be characterized in that, in an electric compressor provided with a compression mechanism and a motor that drives the compression mechanism, the motor is one of the motors described above.

Advantageous Effects of Invention

By making an angular portion at the end of the side along the outer peripheral portion of the rotor protrude toward the outer periphery by forming the curved portion, it is possible to reduce the cross-sectional area through which a short-circuit magnetic flux from a permanent magnet passes, and thus, it is possible to suppress the level of ineffective magnetic flux. With this configuration, it is possible to enhance the motor performance by enhancing the magnetic efficiency.

DESCRIPTION OF EMBODIMENT

An embodiment of the present invention will be described below by using the drawings.

Figure 1:
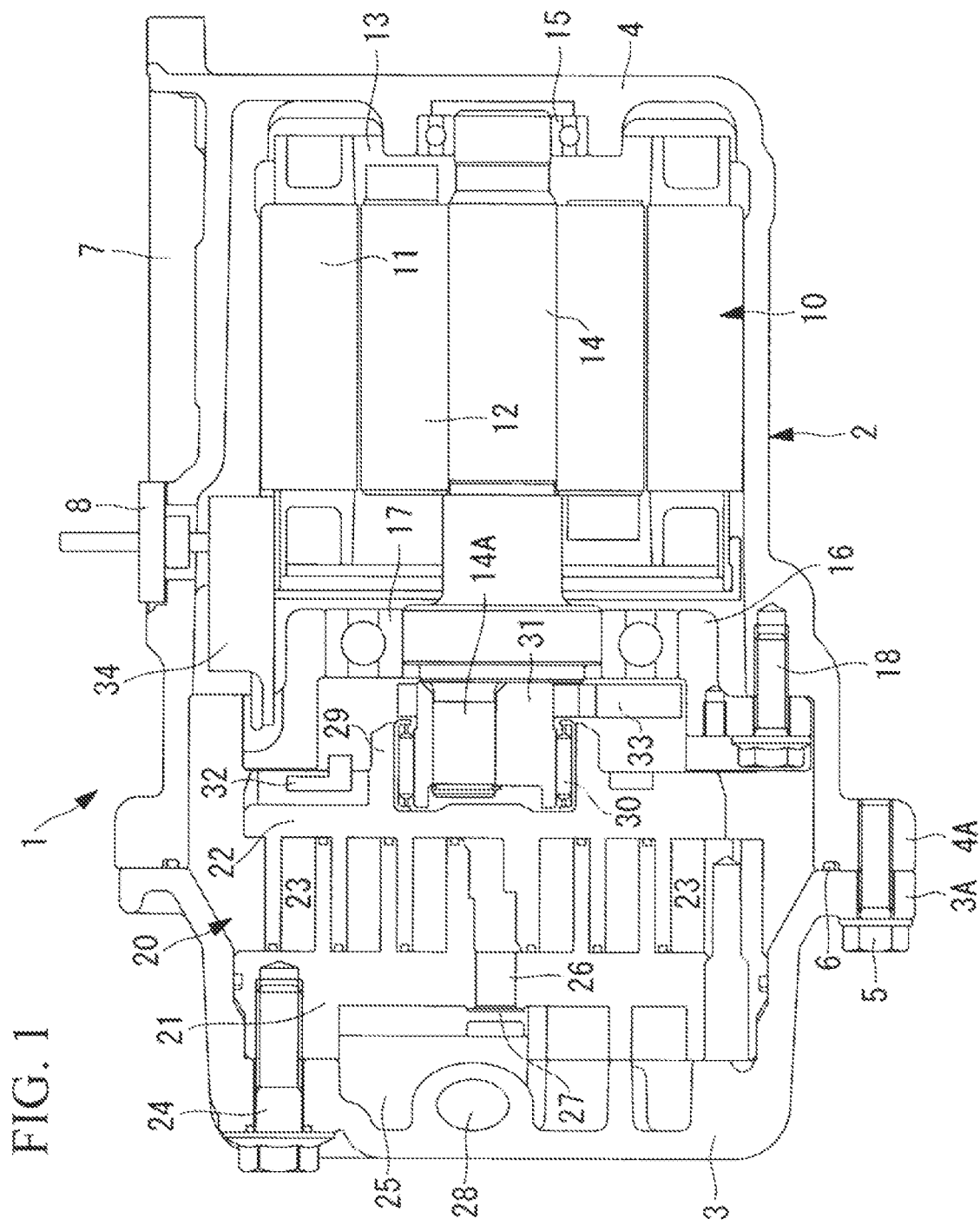
FIG. 1 is a longitudinal sectional view of an electric compressor according to this embodiment.

FIG. 1 shows a longitudinal sectional view of an electric compressor according to this embodiment.

Although a scroll-type electric compressor 1 will be described in this embodiment as an example, the compressor itself is not limited to the scroll type, and it is needless to say that the present invention is applicable to various types of compressors. The electric compressor 1 is provided with a tubular-shaped housing 2, which forms an outer shell. The housing 2 comprises a compressor housing 3 made of die-cast aluminum, having a tubular shape with a closed bottom, and a motor housing 4, and is configured as a single unit formed by fastening flange portions 3A and 4A, which are integrally molded with the respective housings, to each other by using bolts 5 in a state in which an O-ring 6 is sandwiched between the housings.

An inverter accommodating portion 7 is integrally provided at the outer periphery of the motor housing 4. In this inverter accommodating portion 7, an inverter (not shown) is mounted, which converts DC power supplied from a power unit (not shown) to three-phase AC power and applies the AC power to an electric motor (in the following, it may simply be referred to as the motor) 10 that is installed inside the motor housing 4 via a hermetic terminal 8. Note that, as the inverter, a known unit can be employed, and a detailed description thereof will be omitted here.

The electric motor 10 that is installed in the motor housing 4 is provided with a stator 11 and a rotor 12, and the stator 11 is secured to an inner peripheral surface of the motor housing 4 by means of press fitting or the like. Gas pathways (not shown) that pass through in the axial direction between the stator 11 and the motor housing 4 are provided at multiple locations in the circumferential direction. Through these gas pathways, low-pressure refrigerant gas, which is sucked into a space 13 between a bottom surface of the motor housing 4 and an end surface of the electric motor 10 via a suction inlet (not shown) provided at the rear end of the motor housing 4, can be guided frontward with respect to the housing 2.

A rotation shaft (crankshaft) 14 is coupled with the rotor 12 so as to form a single unit. The rear end of this rotation shaft 14 is rotatably supported by a bearing 15 that is provided at a bottom-surface portion of the motor housing 4, and the front end thereof is rotatably supported by a main bearing 17 that is provided on a bearing member 16. At the front end of the rotation shaft 14, a crankpin 14A that is decentered from the center of the rotation shaft by a predetermined distance is integrally provided in the rotational shaft 14 so as to form a single unit. Note that the bearing member 16 is secured to and supported at the open end of the motor housing 4 by using bolts 18.

On the other hand, a scroll compression mechanism (compression mechanism) 20 is provided inside the compressor housing 3. This scroll compression mechanism 20 is a known compression mechanism that is configured by engaging a pair of scrolls consisting of a fixed scroll 21 and an orbiting scroll 22, in which a pair of compression chambers 23 formed between the two scrolls 21 and 22 move toward a center portion from an outer peripheral portion due to revolving motion of the orbiting scroll 22 while reducing the volume thereof, thus compressing low-pressure refrigerant gas to high-pressure gas.

The fixed scroll 21 is fixed on the bottom surface of the compressor housing 3 by securing it thereto by means of bolts 24, and a discharge chamber 25 is formed between an end-plate back surface of the fixed scroll 21 and the bottom surface of the compressor housing 3. Via a discharge port 26 and a discharge valve 27, high-pressure gas is discharged into this discharge chamber 25 from a central compression chamber, which is formed when the pair of compression chambers 23 come together at the center portion, and the high-pressure gas is discharged from the discharge chamber 25 to the exterior via a discharge pipe (not shown) that is connected to a discharge outlet 28.

An end-plate back surface of the orbiting scroll 22 is supported by a thrust surface of the above-described bearing member 16. In addition, in the orbiting scroll 22, the crankpin 14A of the rotation shaft 14 is coupled to a boss portion 29 provided at the end-plate back surface via a needle bearing 30 and a drive bush 31, and the orbiting scroll 22 is configured so as to be driven by the rotation of the rotation shaft 14 in a revolving manner with respect to the fixed scroll 21. This orbiting scroll 22 is prevented from being rotated about itself by means of an Oldham ring 32 that is disposed between the end-plate back surface and the bearing member 16. Note that the drive bush 31 is integrally provided with a balance weight 33 for adjusting unbalanced load associated with driving of the orbiting scroll 22 in a revolving manner.

Figure 2:
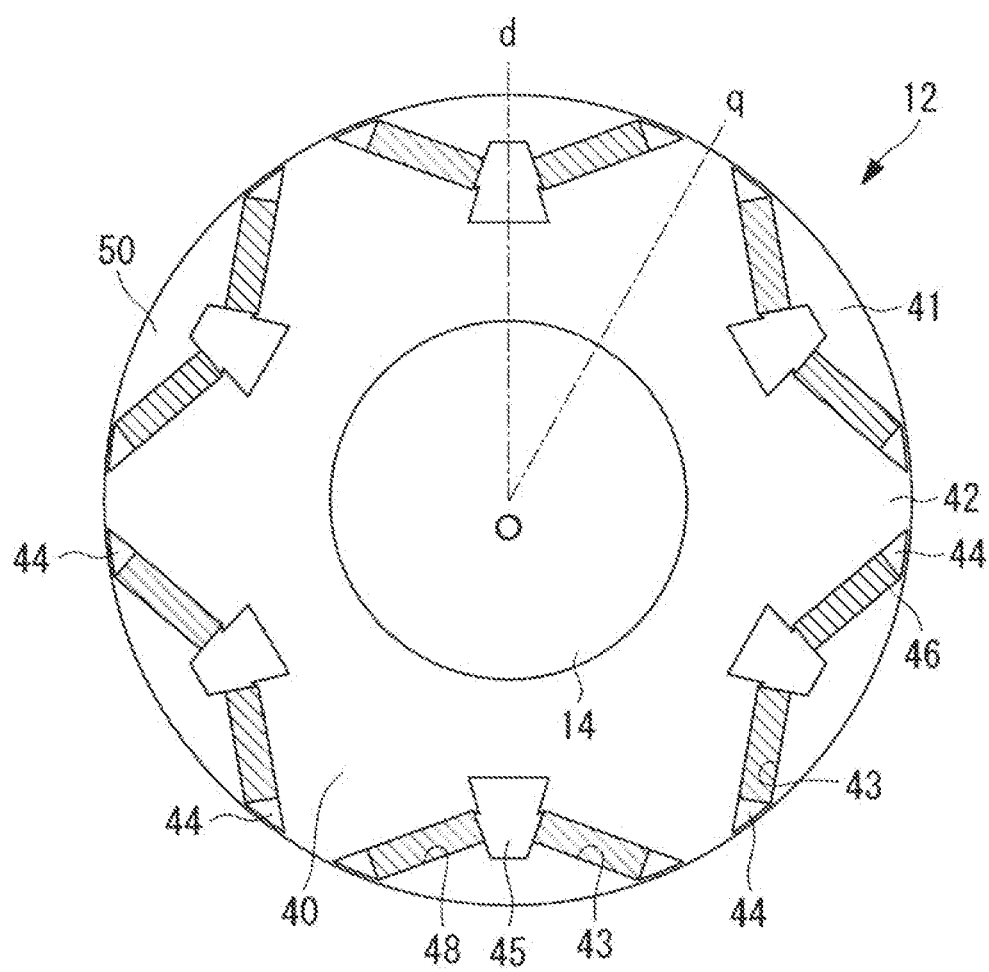
FIG. 2 is a diagram showing the configuration of a rotor.

As shown in FIG. 2, the rotor 12 of the electric motor 10 of the above-described electric compressor 1 has a rotor iron core 40 having a cylindrical shape formed by laminating numerous thin plate-like magnetic steel plates 50, and the rotation shaft 14 is secured to a center portion of the rotor 12, passing therethrough in the axial direction. This rotor iron core 40 has a configuration in which a plurality of poles, namely, main magnetic pole portions 41 that are provided with magnet-insertion holes 43 for embedding permanent magnets (in the following, they may simply be referred to as the magnets) 46, where a number of the main magnetic pole portions corresponds to the number of motor poles (six poles in this embodiment), and auxiliary magnetic pole portions (auxiliary salient pole portions) 42, which are formed of iron core portions between the main magnetic pole portions 41, are alternately disposed at the outer peripheral portion in the circumferential direction so as to surround the rotation shaft 14.

This electric motor 10 is configured so that, when three-phase AC power is applied to the stator 11 and a rotational magnetic field is generated, this rotational magnetic field acts on the permanent magnets 46 of the rotor 12 to generate magnet torque, and reluctance torque also acts on the rotor 12 in addition to the magnet torque.

Here, in FIG. 2, assuming that an axis d is an axis that passes through a rotor center O and a center of the main magnetic pole portion 41 in the circumferential direction and that an axis q is an axis that passes through a center portion located between the main magnetic pole portions 41, in other words, an axis that passes through the rotor center O and a center of the auxiliary magnetic pole portion 42 in the circumferential direction, reluctance torque is generated by differences of penetration degrees of magnetic fluxes that pass along the axis d and the axis q. Note that this embodiment describes an example of a six-pole motor in which the axes d and the axes q are provided every 60° at equal intervals.

The individual main magnetic pole portions 41 are provided with the substantially V-shaped magnet-insertion holes 43 whose protruding portions are provided so as to protrude toward the rotor center O at the centers of the main magnetic pole portions 41 in the circumferential direction; magnetic shielding spaces (flux barriers) 44 are provided at both ends of the V-shaped protruding portions in the circumferential direction; and, in addition, relatively large magnetic shielding spaces (flux barriers) 45, which have a substantially trapezoidal shape, are provided at the V-shaped protruding portions, in other words, the center portions of the V-shaped magnet-insertion holes 43. By setting the top and bottom sides of these magnetic shielding spaces 45 to appropriate lengths, the magnetic shielding spaces 45 have a predetermined width in the circumferential direction and take a triangular shape whose top and bottom portions protrude radially outward and inward by predetermined distances with respect to the magnet-insertion holes 43.

In magnet holding portions 48 located between the magnetic shielding spaces 44, which are at both ends of the substantially V-shaped magnet-insertion holes 43 in the circumferential direction, and the magnetic shielding spaces 45, which are at the center portions of the magnet-insertion holes 43, two permanent magnets 46 having a rectangular cross-section are embedded for each pole.

Figure 3:
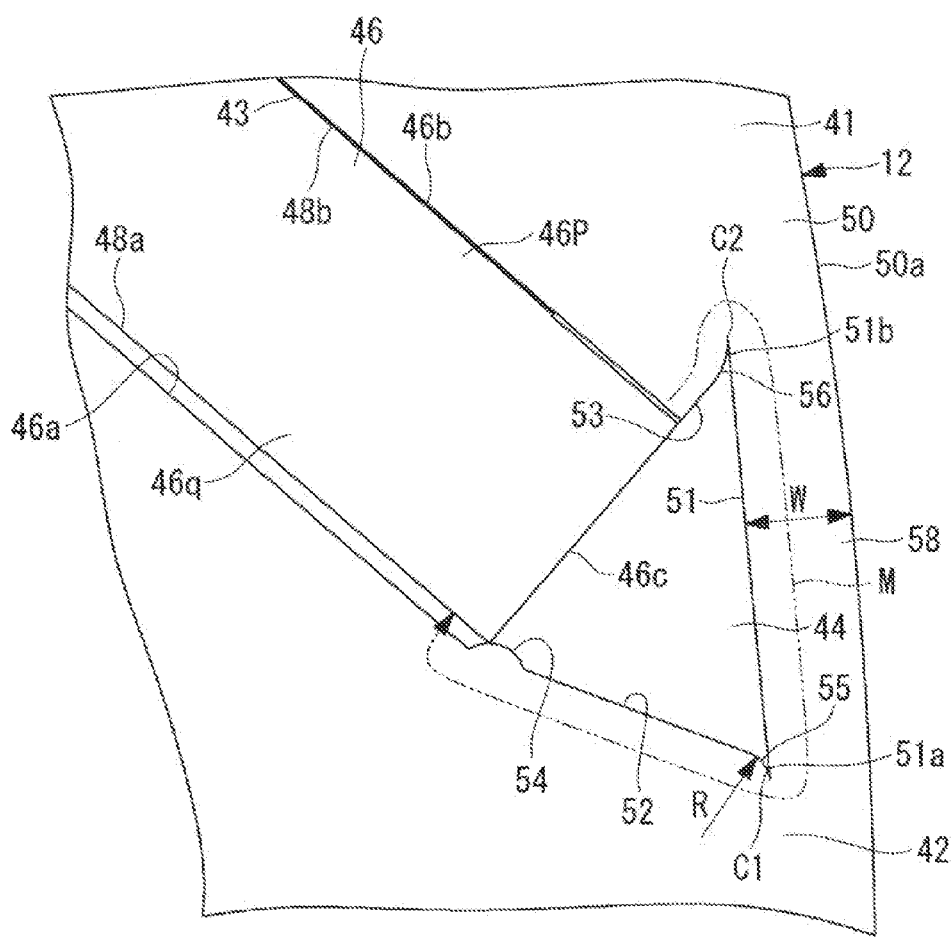
FIG. 3 is a diagram showing the configuration of a magnetic shielding space.

As shown in FIG. 3, the magnet holding portions 48 have two opposing sides 48a and 48b that face long sides 46a and 46b that are parallel to each other and provided in the permanent magnet 46 having the rectangular cross-section.

As the magnets 46, it is desirable to employ, for example, neodymium-based rare-earth magnets manufactured by using the grain-boundary diffusion alloying method or the like, which have smaller size, high heat resistance, and high holding power. Note that the two permanent magnets 46 that are embedded in the magnet-insertion holes 43 of each pole are secured inside the magnet holding portions 48 of the magnet-insertion holes 43 by using an appropriate method, such as self-clinch or the like.

A specific shape of the magnetic shielding space 44 will now be described. The magnetic shielding space 44 as a whole has, for example, a substantially triangular shape. Three sides thereof include an outer-periphery side 51 that extends along an outer peripheral portion 50a of the magnetic steel plates 50 that constitute the rotor 12, a first side 52 that extends from a first end 51a of the outer-periphery side 51 toward the magnet-insertion hole 43, and a second side 53 that extends from a second end 51b of the outer-periphery side 51 toward the magnet-insertion hole 43.

The outer-periphery side 51 is an arc that is formed concentrically with the outer peripheral portion 50a of the magnetic steel plates 50, which constitute a part of the rotor 12, and with a certain radius of curvature. Accordingly, an outer-peripheral frame portion 58 that is continuous along the outer peripheral portion 50a of the magnetic steel plates 50 is formed between the outer-periphery side 51 and the outer peripheral portion 50a of the magnetic steel plates 50, and this outer-peripheral frame portion 58 is formed with a certain width W.

The first side 52 is formed so as to be continuous from the first end 51a of the outer-periphery side 51 to the opposing side 48a, which is located in the magnet holding portion 48 away from the outer-periphery side 51. Also, a protrusion 54 for positioning and securing the permanent magnet 46 is formed in the vicinity of the opposing side 48a of the magnet holding portion 48.

In addition, the second side 53 is formed so as to extend from the second end 51b of the outer-periphery side 51 toward an end of an opposing side 48b of the magnet holding portion 48. In other words, one side of the magnetic shielding space 44 is formed by an end 46c of the permanent magnet 46 held in the magnet holding portion 48 and the second side 53.

Curved portions 55 and 56 that has shapes protruding toward the interior space of the magnetic shielding space 44 are formed in the vicinity of angular portions where the first side 52 and the second side 53 intersect the outer-periphery side 51, in other words, ends that are close to the first end 51a and the second end 51b of the outer-periphery side 51. These curved portions 55 and 56 are formed to have a predetermined radius of curvature R and have centers at the outer periphery area of the magnetic shielding space 44.

With respect to the plate thickness T of a single magnetic steel plate 50 in the laminated direction, it is possible to form the radius of curvature R of such curved portions 55 and 56 so as to satisfy the following:

$$0.5 \leq R/T \leq 1.0.$$

In addition, with respect to an external diameter RG of the rotor 12, it is possible to form the radius of curvature R of such curved portions 55 and 56 so as to satisfy the following:

$$0.0001 \leq R/RG \leq 0.01.$$

By forming such curved portions 55 and 56, angular portions C1 and C2 of the magnetic shielding space 44, which are positioned at both ends of the outer-periphery side 51, are positioned so as to protrude more toward the outer periphery as compared with the case in which the curved portions 55 and 56 are formed as straight portions.

With such a scroll-type electric compressor 1, when power is applied to the electric motor 10 via the inverter (not shown) installed in the inverter accommodating portion 7, and the electric motor 10 is driven, low-pressure refrigerant gas is sucked into the space 13 via the suction inlet provided in the motor housing 4. This low-pressure gas passes through the gas pathways between the stator 11 and the motor housing 4, is guided to a space in the bearing member 16 after cooling the inverter in the inverter accommodating portion 7 via wall surfaces of the motor housing 4, and is then sucked into the pair of compression chambers 23 of the scroll compression mechanism 20 provided in the compressor housing 3.

The low-pressure gas sucked into the pair of compression chambers 23 is compressed by the two compression chambers 23 moving toward the center while decreasing the volume thereof in association with the revolving motion of the orbiting scroll 22. Then, when the two compression chambers 23 come together at the center portion, allowing the compression chamber thereof to communicate with the discharge port 26 provided at the center portion of the fixed scroll 21, the compressed high-pressure gas pushes open the discharge valve 27 and is discharged into the discharge chamber 25. This high-pressure gas is guided to the refrigeration cycle via the discharge outlet 28, and is sucked into the electric compressor 1 again from the suction inlet after being circulated in the refrigeration cycle.

During this period, the DC power supplied from the external power source to the inverter mounted in inverter accommodating portion 7 is converted by the inverter to three-phase AC power having a frequency according to an instruction given to the inverter from a higher-level control device and is applied to the stator 11 of the electric motor 10 from a UVW terminal of the inverter via the hermetic terminal 8 and a cluster block 34 connected to the hermetic terminal 8, a motor lead, and so forth. By doing so, the rotor 12 is driven at a required rotational speed, and the scroll compression mechanism 20 is driven via the rotation shaft 14.

The above-described rotor 12 of the electric motor 10 has the configuration provided with the following elements: the cylindrical rotor iron core 40 where the plurality of poles, namely, the main magnetic pole portions 41 and the auxiliary magnetic pole portions 42, are alternately disposed in the circumferential direction; the substantially V-shaped magnet-insertion holes 43 whose protruding portions are provided so as to protrude toward the rotor center O, in correspondence with the main magnetic pole portions 41, centered on the axes d that pass through the rotor center O and the centers of the main magnetic pole portions 41 in the circumferential direction; and the two permanent magnets 46 that are embedded in these substantially V-shaped magnet-insertion holes 43 at each pole. With this configuration, when the three-phase AC power is applied to the stator 11, and a rotational magnetic field is generated, this rotational magnetic field acts on the permanent magnets 46 of the rotor 12 to generate magnet torque, reluctance torque also acts on the rotor 12 in addition to this magnet torque, and thus, the rotor 12 is driven at predetermined torque.

At this time, in the regions around the magnetic shielding spaces 44, short-circuit magnetic fluxes M from first magnetic poles 46p of the permanent magnets 46 to second magnetic poles 46q thereof are generated in the regions around the first sides 52, the outer-periphery sides 51, and the second sides 53. By forming the curved portions 55 and 56 having a rounded shape at the ends of the first sides 52 and the second sides 53 close to the first end 51a and the second end 51b of the outer-periphery sides 51, the angular portions C1 and C2 of the magnetic shielding spaces 44 positioned at both ends of the outer-periphery sides 51 protrude toward the outer periphery, and, because of this, the flows of the short-circuit magnetic fluxes M take an acute angle at the angular portions C1 and C2. By doing so, the magnetic flux density for a given cross-sectional area of a channel through which the short-circuit magnetic fluxes M flow is reduced, and thus, it is possible to reduce the level of short-circuit magnetic fluxes M.

Figure 4:
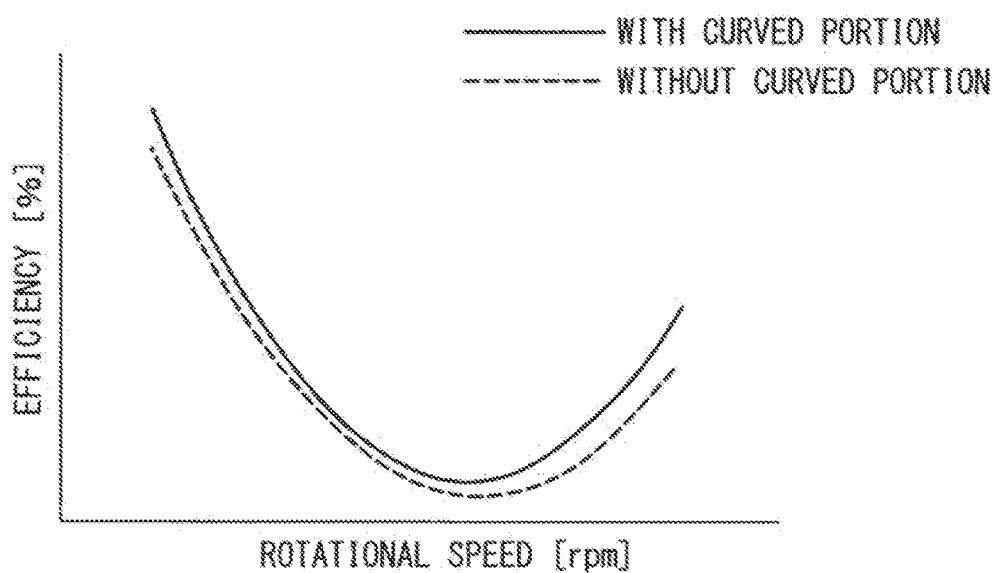
FIG. 4 is a diagram showing calculation results obtained by simulating magnetic efficiency with and without a curved portion.
Figure 5:
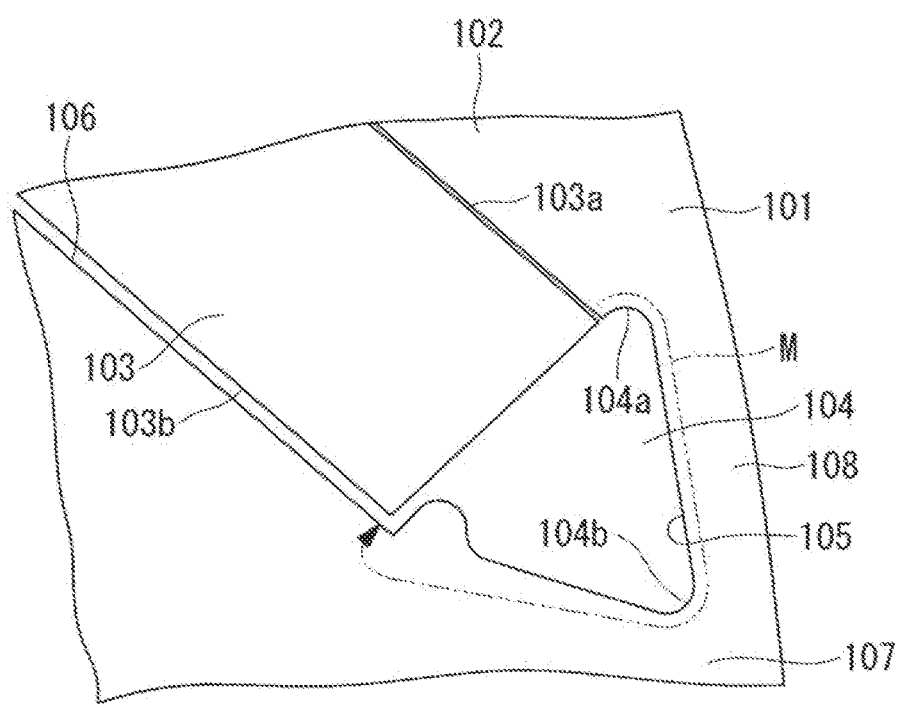
FIG. 5 is a diagram showing the configuration of a conventional rotor.

FIG. 4 shows calculation results obtained by simulating differences in magnetic efficiency with and without curved portions 55 and 56. As shown in FIG. 4, it was confirmed that the magnetic efficiency was increased by providing the curved portions 55 and 56, as compared with the case in which the curved portions 55 and 56 are not provided.

In this way, ineffective magnetic fluxes are reduced in the permanent magnets 46, and the magnetic efficiency thereof is enhanced, thus making it possible to enhance the motor performance.

Note that, although the curved portions 55 and 56 are provided at both the first side 52 and the second side 53 in the above-described embodiment, the curved portions 55 or 56 may be formed at one of the first sides 52 and 53.

In addition, although the curved portions 55 and 56 are formed at the first side 52 and the second side 53, it is also possible to form these curved portions 55 and 56 at both ends of the outer-periphery side 51. In this case, however, the width W of the outer-periphery side 51 is reduced at both ends thereof, which increases likelihood of stress concentration.

Furthermore, although the magnetic shielding space 44 is described to have a triangular shape in the above-described embodiment, even in the case in which a trapezoidal shape or the like is employed, the same advantageous effects can be achieved by employing the same shape as the above description in at least one of the angular portions thereof.

In addition to the above-described configurations, alterations to configurations other than those described above are possible so long as they are within the scope of the present invention.

The present invention can be realized in various other forms without departing from the scope or major features thereof. Accordingly, the above-described Examples are mere examples in all aspects, and the interpretation thereof should not be limited. The scope of the present invention is indicated in the Claims, and it is not restricted by the text of the specification in any way. Furthermore, the scope of the present invention encompasses all modifications and alterations that fall within the range of equivalence of the Claims.

REFERENCE SIGNS LIST 1 electric compressor
10 electric motor
11 stator
12 rotor
14 rotation shaft
20 scroll compression mechanism (compression mechanism)
40 rotor iron core
41 main magnetic pole portion
42 auxiliary magnetic pole portion (auxiliary salient pole portion)
43 magnet-insertion hole
44 magnetic shielding space
45 magnetic shielding space
46 permanent magnet (magnet)
48 magnet holding portion
50 magnetic steel plate
50a outer peripheral portion
51 outer-periphery side
51a first end
51b second end
52 first side
53 second side
55, 56 curved portion
58 outer-peripheral frame portion

The invention claimed is:

1. A motor comprising a rotor, the rotor including:
a cylindrical rotor iron core in which a plurality of main magnetic pole portions and auxiliary magnetic pole portions are alternately disposed in a circumferential direction;
substantially V-shaped magnet-insertion holes that are provided in correspondence with the respective main magnetic pole portions, the magnet-insertion holes respectively being centered on axes d that pass through a center of the rotor and centers of main magnetic pole portions in the circumferential direction, and a protruding portion of each of the magnet-insertion holes being protruding toward the center of the rotor;

two magnets embedded in each of the magnet-insertion holes so as to be along with a substantially V-shape, the two magnets of the respective magnet-insertion holes corresponding to respective poles; and magnetic shielding spaces formed in the substantially V-shaped magnet-insertion holes at both ends thereof in the circumferential direction, wherein each of the magnetic shielding spaces has a side extending along an outer peripheral portion of the rotor, and has angular portions located at both ends of the side of each of the magnetic shielding spaces, wherein each of the angular portions has a curved portion which is formed with a predetermined radius of curvature and whose center is located outside of the magnetic shielding space so that the angular portion has an acute angle, and the side extends along an outer peripheral portion of the rotor.

2. A motor according to claim 1, wherein the curved portion is formed in a side that intersects the side extending along the outer peripheral portion of the rotor, the side is located closer to an inner periphery of the rotor in the magnetic shielding spaces.

3. A motor according to claim 2, wherein the rotor is formed by laminating a plurality of magnetic steel plates, and, assuming that T is a thickness of one of the magnetic steel plates and R is the radius of curvature of the curved portion, a relation "$0.5 \leq R/T \leq 1.0$" is satisfied.

4. A motor according to claim 2, wherein the rotor is formed by laminating a plurality of magnetic steel plates, and, assuming that RG is an external diameter of one of the magnetic steel plates and that R is the radius of curvature of the curved portion, a relation "$0.0001 \leq R/RG \leq 0.01$" is satisfied.

5. An electric compressor comprising a compression mechanism and a motor that drives the compression mechanism, wherein the motor according to claim 1 is employed as the motor.

6. The motor according to claim 1, wherein the curved portion has an angular range formed in an obtuse angle viewed from the center.

* * * * *